United States Patent
Fuoco et al.

(10) Patent No.: US 6,535,958 B1
(45) Date of Patent: Mar. 18, 2003

(54) MULTILEVEL CACHE SYSTEM COHERENCE WITH MEMORY SELECTIVELY CONFIGURED AS CACHE OR DIRECT ACCESS MEMORY AND DIRECT MEMORY ACCESS

(75) Inventors: Charles L. Fuoco, Allen, TX (US); Sanjive Agarwala, Richardson, TX (US); David A. Comisky, Plano, TX (US); Timothy D. Anderson, Dallas, TX (US); Christopher L. Mobley, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 316 days.

(21) Appl. No.: 09/603,637

(22) Filed: Jun. 26, 2000

Related U.S. Application Data

(60) Provisional application No. 60/166,527, filed on Nov. 18, 1999, and provisional application No. 60/144,550, filed on Jul. 15, 1999.

(51) Int. Cl.⁷ .................................................. G06F 13/00
(52) U.S. Cl. ........................ 711/122; 711/129; 711/146
(58) Field of Search ................................. 711/122, 129, 711/146

(56) References Cited

U.S. PATENT DOCUMENTS

| | | | | |
|---|---|---|---|---|
| 5,526,510 A | * | 6/1996 | Akkary et al. ................. | 710/57 |
| 5,797,026 A | * | 8/1998 | Rhodehamel et al. ........ | 711/146 |
| 5,895,495 A | * | 4/1999 | Arimilli et al. ............. | 711/122 |
| 6,122,715 A | * | 9/2000 | Palanca et al. ............. | 711/154 |
| 6,195,729 B1 | * | 2/2001 | Arimilli et al. ............. | 711/119 |
| 6,378,048 B1 | * | 4/2002 | Prudvi et al. ................ | 711/122 |

* cited by examiner

Primary Examiner—Reba I. Elmore
(74) Attorney, Agent, or Firm—Robert D. Marshall, Jr.; W. James Brady, III; Frederick J. Telecky, Jr.

(57) ABSTRACT

A data processing system having a central processing unit, at least one level one cache, a level two unified cache, a directly addressable memory and a direct memory access unit includes a snoop unit generating snoop accesses to the at least one level one cache upon a direct memory access to the directly addressable memory. The snoop unit generates a write snoop access to both level one caches upon a direct memory access write to or a direct memory access read from the directly addressable memory. The level one cache also invalidates a cache entry upon a snoop hit and also writes back a dirty cache entry to the directly addressable memory. A level two memory is selectively configurable as part level two unified cache and part directly addressable memory.

8 Claims, 9 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

MULTILEVEL CACHE SYSTEM COHERENCE WITH MEMORY SELECTIVELY CONFIGURED AS CACHE OR DIRECT ACCESS MEMORY AND DIRECT MEMORY ACCESS

This application claims priority under 35 USC §119(e)(1) of Provisional Application No. 60/166,527, filed Nov. 18, 1999 and Provisional Application No. 60/144,550, filed Jul. 15, 1999.

CROSS REFERENCE TO RELATED APPLICATIONS

This application is related to the following co-pending applications:

U.S. patent application Ser. No. 09/603,365 entitled UNIFIED MULTILEVEL MEMORY SYSTEM ARCHITECTURE WHICH SUPPORTS BOTH CACHE AND ADDRESSABLE SRAM filed Jun. 26, 2000, which claims priority from U.S. Provisional Application No. 60/166,538 filed Nov. 18, 1999 and U.S. Provisional Application No. 60/144,550 filed Jul. 15, 1999;

U.S. Pat. No. 6,446,241 entitled AN AUTOMATED METHOD FOR TESTING CACHE issued Sep. 3, 2002;

U.S. patent application Ser. No. 09/603,057 entitled METHOD AND APPARATUS FOR OPERATING ONE OR MORE CACHES IN CONJUNCTION WITH DIRECT MEMORY ACCESS CONTROLLER filed Jun. 26, 2000, which claims priority from U.S. Provisional Application No. 60/144,569 filed Jul. 15, 1999;

U.S. patent application Ser. No. 09/603,645 entitled UNIFIED MEMORY SYSTEM ARCHITECTURE INCLUDING CACHE AND DIRECTLY ADDRESSABLE STATIC RANDOM ACCESS MEMORY filed Jun. 26, 2000, which claims priority from U.S. Provisional Application No. 60/166,534 filed Nov. 18, 1999 and U.S. Provisional Application No. 60/144,550 filed Jul. 15, 1999;

U.S. patent application Ser. No. 09/603,333 entitled PROGRAMMER INITIATED CACHE BLOCK OPERATIONS filed Jun. 26, 2000, which claims priority from U.S. Provisional Application No. 60/166,535 filed Nov. 18, 1999 and U.S. Provisional Application No. 60/144,550 filed Jul. 15, 1999; and U.S. Pat. No. 6,408,345 entitled SUPERSCALAR MEMORY TRANSFER CONTROLLER IN MULTILEVEL MEMORY ORGANIZATION issued Jun. 18, 2002.

TECHNICAL FIELD OF THE INVENTION

The technical field of this invention is data processing systems and particularly data processing systems with combined cache memory and static random access memory, and direct memory access.

BACKGROUND OF THE INVENTION

Data processing systems typically employ data caches or instruction caches to improve performance. A small amount of high speed memory is used as the cache. This cache memory is filled from main memory on an as needed basis. When the data processor requires data or an instruction, this is first sought from the cache memory. If the data or instruction sought is already stored in the cache memory, it is recalled faster than it could have been recalled from main memory. If the data or instruction sought is not stored in the cache memory, it is recalled from main memory for use and also stored in the corresponding cache. A performance improvement is achieved using cache memory based upon the principle of locality of reference. It is likely that the data or the instruction just sought by the data processor will be needed again in the near future. Use of cache memories speeds the accesses needed to service these future needs. A typical high performance data processor will include instruction cache, data cache or both on the same integrated circuit as the data processor core.

Cache memories are widely used in general purpose microprocessors employed in desktop personal computers and workstations. Cache memories are frequently used in microprocessors employed in embedded applications in which the programmable nature of the microprocessor controller is invisible to the user. Caching provides a hardware managed, programmer transparent access to a large memory space via a physically small static random access memory (SRAM) with an average memory access time approaching the access time of the SRAM. The hardware managed and programmer transparent aspect of cache systems enables better performance while freeing the programmer from explicit memory management.

Cache memories are typically not used with digital signal processors. Digital signal processors are generally used in applications with real time constraints. Such real time constraints typically do not operate well with cache memories. When employing cache memories the access time for a particular instruction or data cannot be predetermined. If the sought item is stored in the cache, then the access time is a known short time. However, if the item sought is not stored in the cache, then the access time will be very much longer. Additionally, other demands for main memory access will make the access time from main memory vary greatly. This variation in memory access time makes planning for real time applications extremely difficult or impossible.

Digital signal processors will more typically include some directly addressable SRAM on the same integrated circuit as the data processor core. The programmer must manage transfer of critically needed instructions and data to the on-chip SRAM. Often this memory management employs a direct memory access unit. A direct memory access unit typically controls data moves between memories or between a memory and a peripheral ordered by the data processor core. Once begun on a particular data transfer the direct memory access unit operates autonomously from the data processor core. Once stored in the on-chip SRAM, these items are available to the data processor core at a greatly lowered access time. Thus these items will be available to service the real time constraints of the application. Note that both the data processor core and the direct memory access unit may access the on-chip SRAM. The memory management task is difficult to program. The programmer must anticipate the needs of the application for instructions and data and assure that these items are loaded into the on-chip SRAM ahead of their need. Additionally, the programmer must juggle conflicting needs for the typically limited space of the on-chip SRAM. While this is a difficult programming task, it is generally preferable to the unknown memory latencies of cache systems in real time applications.

Digital signal processor architectures are becoming more complex. The complexity of new applications have increased and their real time constraints have become more stringent. These advances have made the programming problem of real time memory management using on-chip SRAM increasingly difficult. This has slowed applications development. With variety in the size of on-chip SRAM and the variations in external memory latency, these programs have increasingly been limited to specific product configurations. Thus it has not been possible to employ the same set of instructions to solve a similar memory management problem in a similar product. This need for custom algorithms for each product prevents re-use of instruction blocks and further slows product development. The increasing architectural capabilities of processors also require bigger on-chip memories (either cache or SRAM) to prevent processor stalls. Processor frequencies are increasing. This increasing memory size and processor frequency works against easy scaling of the on-chip memory with increasing data processing requirements.

A recent development is the provision of a single memory on the integrated circuit which can be partitioned into varying amounts of cache and ordinary SRAM. This development is evidenced in co-pending U.S. patent application Ser. No. 09/603,645 filed contemporaneously with this application entitled UNIFIED MEMORY SYSTEM ARCHITECTURE INCLUDING CACHE AND ADDRESSABLE STATIC RANDOM ACCESS MEMORY claiming priority from U.S. Provisional Application No. 60/144,550 filed Jul. 15, 1999 and U.S. Provisional Application No. 60/166,534 filed Nov. 19, 1999. The programmer can then select the proportions of cache and SRAM appropriate for the then current operation of the digital signal processor.

There is a need in the art for a manner of ensuring cache coherence in a data processing system employing cache, directly addressable SRAM and direct memory access.

SUMMARY OF THE INVENTION

This invention concerns a data processing system having a central processing unit, at least one level one cache, a level two unified cache, a directly addressable memory and a direct memory access unit. The data processing system further includes a snoop unit generating snoop accesses to the at least one level one cache upon a direct memory access to the directly addressable memory. The at least one level one cache preferably includes a level one instruction cache and a level one data cache.

The snoop unit generates a write snoop access to both level one caches upon a direct memory access write to the directly addressable memory. The level one instruction cache invalidates a cache entry upon a snoop hit following a write snoop access. The level one data cache also invalidates a cache entry upon a snoop hit following a write snoop access. The level one data cache further writes back a dirty cache entry to the directly addressable memory if the cache entry is dirty, that is if it has been modified in the level one data cache.

The snoop unit generates a read snoop access to the level one data cache upon a direct memory read access from the directly addressable memory. The level one data cache invalidates a cache entry upon a snoop hit a read snoop access and writes back the cache entry to the directly addressable memory if dirty.

The snoop unit generates an eviction snoop access to the level one data cache upon a cache entry eviction from the level two unified cache. The level one data cache invalidates a cache entry upon a snoop hit following an eviction snoop access and writes back the cache entry to the level two unified cache if the cache entry is dirty.

In the preferred ebodiment a level two memory is selectively configurable as part level two unified cache and part directly addressable memory.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
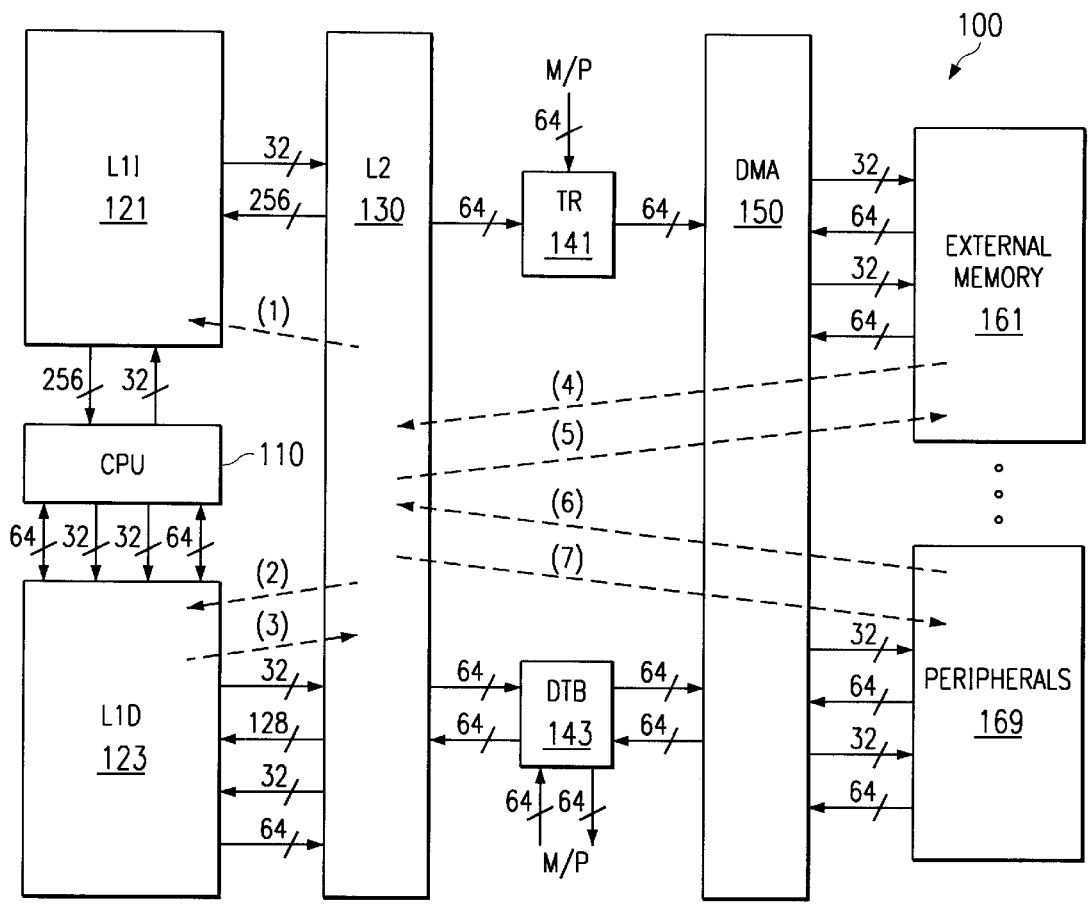
FIG. 1 illustrates the organization of a typical digital signal processor to which this invention is applicable.

FIG. 1 illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 13 and 14.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. This aspect of the digital signal processor system is further detailed in contemporaneously filed U.S. patent application Ser. No. 09/603,644 entitled UNIFIED MEMORY SYSTEM ARCHITECTURE INCLUDING CACHE AND ADDRESSABLE STATIC RANDOM ACCESS MEMORY claiming priority from U.S. Provisional Application No. 60/144,550 filed Jul. 15, 1999 and U.S. Provisional Application No. 60/166,534 filed Nov. 19, 1999. In accordance with the invention described in this contemporaneously filed patent application some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon; a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 160. This can take place upon: a cache miss to level two unified cache 130 service from external memory (4) or a direct memory access 150 data movement from external memory 161 and level two unified cache 130 configured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: or a direct memory access 150 data movement from peripheral 169 and level two unified cache 130 configured as SRAM; or a direct memory access 150 data movement from a portion of level two unified cache 130 configured as SRAM to peripherals 169. All data movement between level two unified cache 130 and external memory 161 and between level two unified cache 130 and peripherals 169 employ data transfer bus 143 and are controlled by direct memory access unit 150. These direct memory access data movements may take place as result of a command from central processing unit core 110 or a command from another digital signal processor system received via transfer request bus 141.

The number and variety of possible data movements within digital signal processor system 100 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache entry just victimized and being evicted from the cache. Another example in a non-write allocate cache is a read from a cache entry following a write miss to that address with the newly written data in a write buffer waiting write to main memory. The cache system must include hardware to detect and handle such special cases.

A cache system including a second level cache, such as that described above in conjunction with FIG. 1, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a normal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then this is noted in the snoop response but no data moves. In this case the higher level cache stores a valid copy of the data and can supply this data.

A level two cache increases the special cases where there are hazards. Additional hazards with a two level cache include snoops to a lower level cache where the corresponding data is a victim being evicted, snoops to data in during a write miss in the lower level cache for non-write allocation systems which places the data in a write buffer. Other hazards are also possible.

An additional complication occurs when all or part of level two unified cache 130 is configured as SRAM. There is normally not a problem with coherence of SRAM as a top level memory. However, digital signal processing system 100 supports direct memory access to and from the portion, if any, of level two unified cache 130 configured as SRAM. Thus the SRAM configured portion of level two unified cache 130 may receive data via a direct memory access transfer that is cached in either level one instruction cache 121 or in level one data cache 123. On the other hand, data within the SRAM configured portion of level two unified cache 130 may be transferred out via a direct memory access transfer. In this event, the cache system must check to make sure that a newer copy of the same data is not stored in level one data cache 123.

The following is a description of coherence mechanism for digital signal processor 100 illustrated in FIG. 1. It should be appreciated that the coherence protocols for the level one caches are generally as known in the art and that there are new protocols for the level two cache.

In the preferred embodiment level one instruction cache 121 is a 4 Kbyte memory having a cache entry size of 64 bytes. As will be described further below, central processing unit 110 is preferably a very long instruction word (VLIW) data processor core which can simultaneously execute plural instructions. These instructions are preferably 32 bits each and are fetched in fetch packets of eight instructions each. Thus each fetch packet includes 32 bytes and each cache entry includes two such fetch packets. Level one instruction cache 121 is preferably direct mapped, that is each cache set includes only a single cache entry. This cache size, organization and cache entry size results in 64 sets. Each cache entry includes address and tag bits organized as noted in Table 1.

TABLE 1

|  | Tag | Set | Offset |
| --- | --- | --- | --- |
| Bit Numbers | 31:12 | 11:6 | 5:0 |
| Number of Bits | 20 | 6 | 6 |

The external memory space is byte addressed, that is, each memory address points to a byte in memory. This is true regardless of the actual width of the memory. The 6 bit offset determines a byte within the 64 byte cache entry. The 6 bit set selects one of the 64 cache sets. The remaining 20 bits enable specification of any address within the external memory space. On an instruction fetch the 20 most significant bits of the fetch address is compared in parallel with the 20 bit address tag of each of the 64 cache sets. A match indicates a cache hit. The next less significant bit of the fetch address selects one of the two fetch packets within the cache entry. Note that the fetch address normally increments by 32 to point to a new 32 byte fetch packet. The tag memory is preferably dual ported. This permits simultaneous access by central processing unit 110 for an instruction fetch and by level two unified cache 130 for a snoop cycle. As will be described below, a snoop cycle does not involve data access, therefore the instruction memory array may be a single bank of single ported memory.

Level one instruction cache 121 is preferably direct mapped, that is, data at a particular external memory address may only be stored in a single location within the cache. Since each external address maps to only one location within level one instruction cache 121, the data at that location is replaced for the cache fill upon a cache miss. Level one instruction cache 121 preferably does not support self-modifying code. Thus writes to alter data within level one instruction cache 121 are not supported. The bus between level one instruction cache 121 and central processing unit 110 is preferably 256 bits wide enabling simultaneous transfer of a fetch packet of 8 32-bit instructions. Level one instruction cache 121 preferably operates on the following four stage pipeline.

PG central processing unit 110 generates a new program counter (instruction address) value PS central processing unit 110 transmits the address to level one instruction cache 121

PW level one instruction cache 121 performs tag lookup and address comparisons, and accesses the instruction fetch packet on a cache hit PR level one instruction cache 121 transmits the fetch packet to central processing unit 110.

Figure 2:
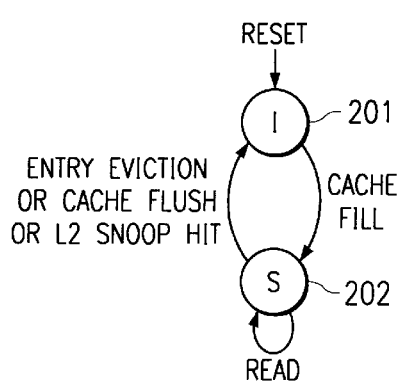
FIG. 2 illustrates the preferable cache coherence model for the level one instruction cache illustrated in FIG. 1.

FIG. 2 illustrates the preferable cache coherence process for level one instruction cache 121. Level one instruction cache 121 maintains a cache state for each of the 64 cache entries. Upon reset all cache entries are invalid (state 201). When a cache entry is filled, generally from level two unified cache 130 following a cache read miss, the cache state for the new data is set to shared (state 202). This assumes that the requested address is cacheable. Generally instructions would be stored in cacheable memory locations. A read hit on a cache entry in the shared state 202 maintains the shared state.

Figure 3:
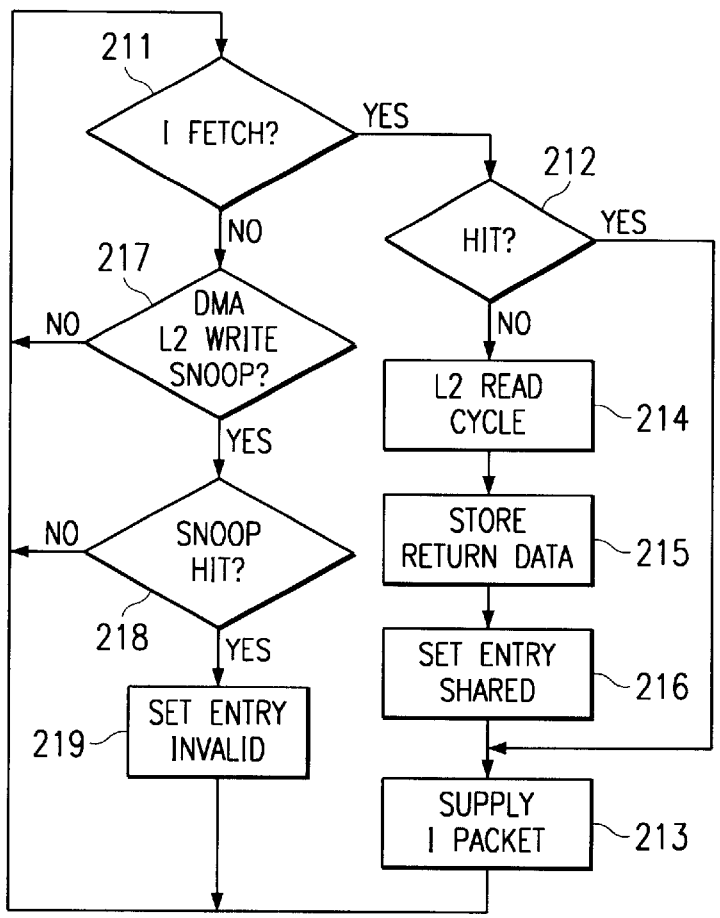
FIG. 3 is a flow chart illustrating the cache coherence process of the level one instruction cache.

FIG. 3 illustrates in flow chart form the cache coherence process of the level one instruction cache 121. In the simplest case upon detection of an instruction fetch (Yes at decision block 211), level one instruction cache 121 checks its tag RAM to determine if the requested instruction is cached there, called a cache hit (Yes at decision block 212). If so, then level one instruction cache 121 supplies the requested instruction packet to central processing unit 110 (processing block 213). There is no change in the cache tags.

There are several events that can change the cache state of a cache entry from shared state 202 to invalid state 201. A cache flush invalidates all the cache entries. Thus the cache state of each of the 64 cache entries would be set to the invalid state 201. A cache read miss occurs when central processing unit 110 generates an instruction fetch request (Yes at decision block 211) and the corresponding instruction fetch packet is not stored in the cache (No at decision block 212). Level one instruction cache 121 generates a read cycle to the next memory level, which is level two unified cache 130 (processing block 214). A cache entry must be evicted for the cache fill. In the preferred embodiment level one instruction cache 121 is direct mapped. Thus the data at any particular memory address may be stored in only one cache entry. Upon a cache read miss, the cache entry corresponding to the memory address producing the miss will be evicted. This will be followed by a cache fill from level two unified cache 130 or from external memory. The data returned from level two unified cache 130 is stored in the cache (processing block 215). The cache state of cache entry storing the new data will be set to the shared state 202 (processing block 216). Level one instruction cache 121 then supplies the requested instruction fetch packet to central processing unit 110 (processing block 213).

A direct memory access cycle may also cause a cache entry to move from the shared state 202 to the invalid state 201. Level two unified cache 130 may be configured in whole or in part as directly accessible SRAM. This SRAM will occupy a portion of the memory address space of central processing unit 110. The portion of the address space allocated to this SRAM may be cacheable. In this event, a direct memory access write to this SRAM may be to an address cached in level one instruction cache 121. Upon each such direct memory access write to an SRAM configured portion of level two unified cache 130, a snoop cycle to level one instruction cache 121 occurs (decision block 217). Upon detection of the snoop cycle (Yes at decision block 217), level one instruction cache 121 checks the cache tags to determine if the instructions at that address are cached within (decision block 218). If there is a snoop miss (No at decision block 218), that is if the direct memory access write is to an address not cached in level one instruction cache 121, there are no changes in the cache state of any cache entry. If there is a snoop hit (Yes at decision block 218), that, is if the direct memory access write is to an address cached in level one instruction cache 121, then the cache state of the cache entry corresponding to the memory address is changed from the shared state 202 to the invalid state 201 (processing block 219). No other change takes place. In particular, the new data in the SRAM configured portion of level two unified cache 130 is not immediately cached in level one instruction cache 121. If central processing unit 110 needs an instruction at this address, level one instruction cache 121 will generate a cache read miss (No at decision block 212) because the cache entry is in invalid state 201. This will trigger a cache fill cycle (processing block 214 and 215). When the new data is stored the cache state is changed to shared state 202 (processing block 216). By only invalidating the cache entry and not replacing it, the snoop cycle does not need a port to the memory array. In addition, the snoop cycle does not interfere with the access of central processing unit 110 to instructions cached in level one instruction cache 121.

In the preferred embodiment level one data cache 123 is a 4 Kbyte memory having a cache entry size of 32 bytes. Level one data cache 123 is preferably two way set associative. Thus each memory address aliasing into a particular cache set may be stored in one of two corresponding cache entries. This cache size, organization and cache entry size results in 64 cache sets. There are two tag memory ports, one for each load/store unit of central processing unit 110. Each of the two tag memories includes address and tag bits organized as noted in Table 2.

TABLE 2

|  | Tag | Set | Subline | Word |
|---|---|---|---|---|
| Bit Numbers | 31:11 | 10:5 | 4:3 | 2 |
| Number of Bits | 21 | 6 | 2 | 1 |

The 6 bit set field determines which of 64 sets the memory access falls into. The subline field which of four 64 bit sublines the memory access falls into. The word bit determines whether the memory access falls into an upper of lower half of the 64 bit subline. Note that though the memory is byte addressable, level one data cache 123 transfers data in minimum increments of 32 bits or 4 bytes. Data accesses are always word aligned, thus the two least significant address bits (1:0) are always 0 and may be implied rather than actually transmitted. The remaining 21 bits enable specification of any address within the external memory space. The tag memory is preferably dual ported. This permits simultaneous data access by the two load/store units of central processing unit 110 or one load/store unit access and a snoop cycle access by level two unified cache 130. As in the case of level one instruction cache 121, a snoop cycle does not involve data access. To support the two load/store units the data memory preferably dual ported. Thus two memory accesses are possible without interference.

Level one data cache 123 is preferably two way set associative. Data at a particular external memory address may be stored in either of two locations within the cache. On a cache fill the least recently used data is evicted. There are two busses between level one data cache 123 and central processing unit 110, one to service each of two load/store units. Each bus preferably includes 32 address bits from central processing unit 110 and 64 data bits from the cache. Thus level one data cache 123 can simultaneously transfer a 64 bit data word for each of the two load/store units. Level one data cache 123 preferably operates on the following five stage pipeline.

E1 central processing unit 110 reads its register file and generates a memory address E2 central processing unit 110 transmits the address to level one data cache 123 on a read and transmits the address and data to level one data cache 123 on a write E3 level one data-cache 123 performs tag lookup and address comparisons, and accesses the data on a cache hit E4 level one data cache 123 sends load data to central processing unit 110

E5 central processing unit 110 writes load data into the register file

Figure 4:
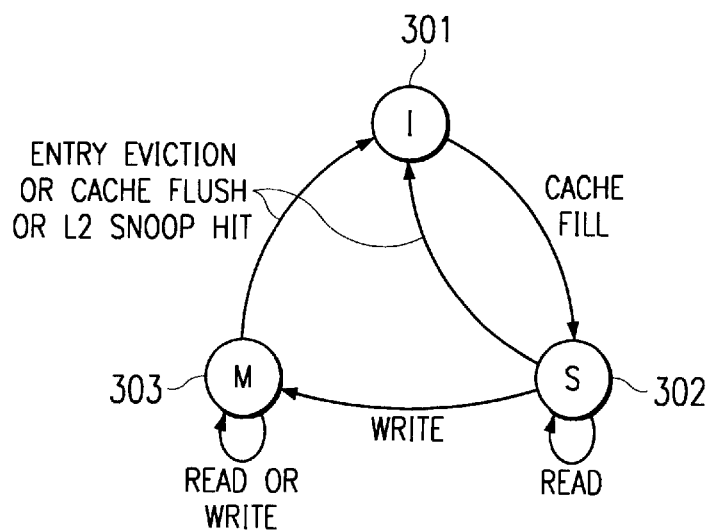
FIG. 4 illustrates the preferable write back cache coherence model for the level one data cache illustrated in FIG. 1.

FIG. 4 illustrates the preferable cache coherence process for level one data cache 123. Level one data cache 123 maintains a cache state for each of the 128 cache entries. Upon reset all cache entries are invalid (state 301). When a cache entry is filled, generally from level two unified cache 130 following a cache read miss, the cache state for the new data is set to shared (state 302). This assumes that the requested address is cacheable. A read hit on a cache entry in the shared state 302 maintains the shared state. A cache hit upon a write to a cache entry in the shared state 302 moves the cache entry to the modified state 303. A cache hit on either a read or a write to a cache entry in the modified state 303 leaves the state unchanged.

Figure 5:
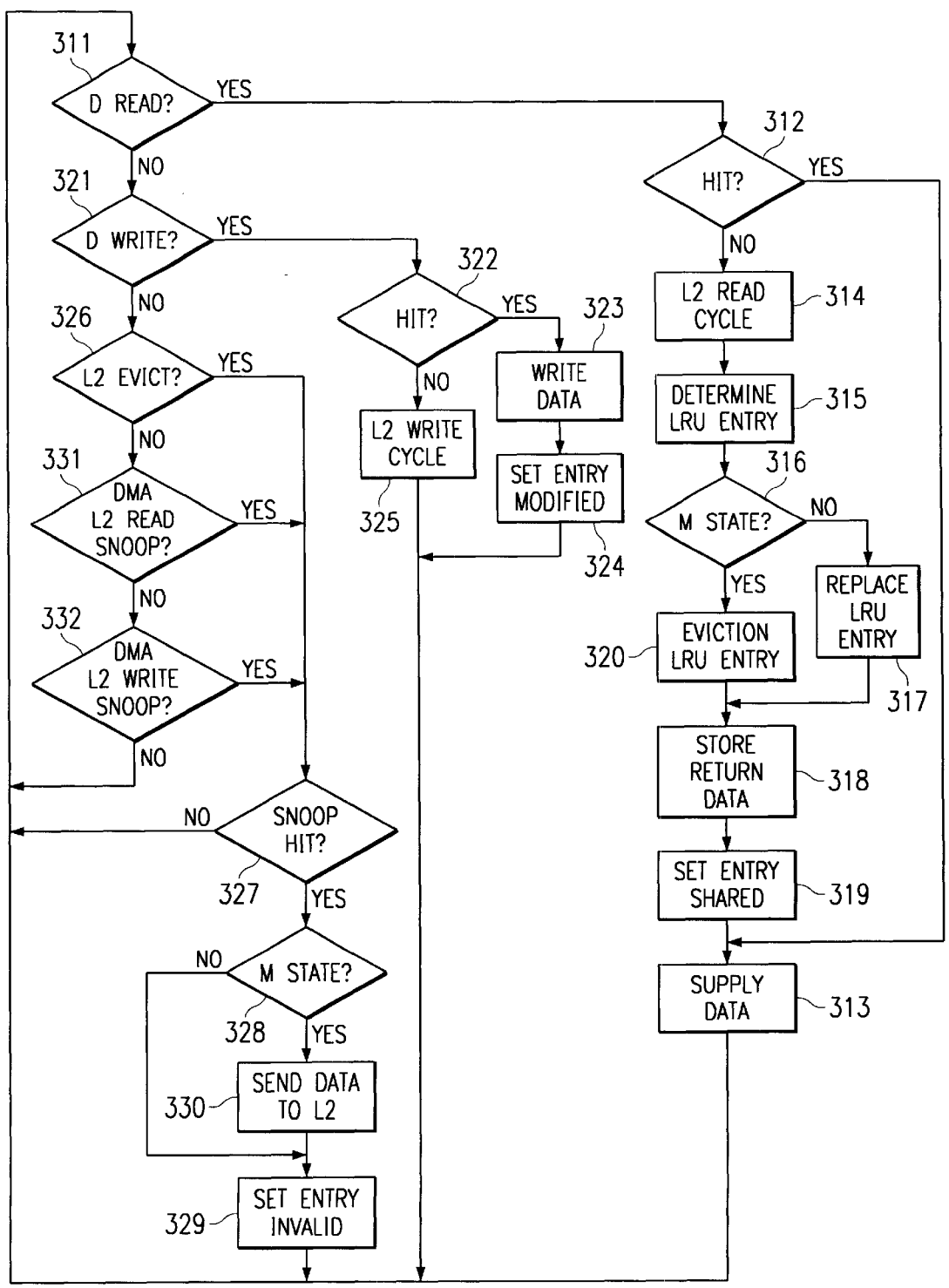
FIG. 5 is a flow chart illustrating the cache coherence process of the level one data cache illustrated in FIG. 1.

FIG. 5 is a flow chart illustrating the cache coherence process of the level one data cache 123. For the simplest case, upon a data read (Yes at decision block 311) and a cache hit (Yes at decision block 312), level one data cache 123 supplies the requested data to central processing unit 110 (processing block 313). As illustrated in FIG. 4, this involves no change in the cache state of any cache entry.

Referring back to FIG. 4, there are several events that can change the cache state of a cache entry from shared state 302 or modified state 303 to invalid state 301. A cache flush invalidates all the cache entries. Thus the cache state of each of the 128 cache entries would be set to the invalid state 301. Another event is a cache entry eviction.

A read cycle to level two unified cache 130 (processing block 314) is generated following a data read (Yes at decision block 311) and a cache read miss (No at decision block 312). On a cache read miss a cache entry must be evicted for the cache fill. In the preferred embodiment level one data cache 123 is two way set associative. Thus the data at any particular memory address may be stored in either of two cache entries. Upon a cache read miss, the least recently used cache entry corresponding to the memory address producing the miss will be determined (processing block 315). If that entry is not in modified state 303 (No at decision block 316), then that cache state of that entry is set to the invalid state 301 for the cache entry to be replaced (processing block 317). Next the data returned in response to the cache fill from level two unified cache 130 or from external memory is stored (processing block 318). The cache state of cache entry storing the new data will then be set to the shared state 302 (processing block 319). This data is then supplied to central processing unit 110 responsive to the original data read (processing block 313). If that cache entry is in the modified state 303 (Yes at decision block 316), then the cache state of that entry is set to the invalid state 301 and the modified data is written out (evicted) to level two unified cache 130 (processing block 320). This will be followed by storage of the data returned from level two unified cache 130 or from external memory in response to the cache fill (processing block 318). The cache state of cache entry storing the new data will then be set to the shared state 302 (processing block 319) and the data supplied to central processing unit 110 (processing block 131).

The level one data cache 123 preferably employs a write back without write allocation policy. For a data write to level one data cache 123 (Yes at decision block 321) the address is compared to the tags to determine if the data is stored in the cache (decision block 322). On a write cache hit into level one data cache 123 (Yes at decision block 322), the data is written into level one data cache 123 (processing block 323). The cache state is set to the modified state 303 or remains in the modified state 303 (processing block 324). This modified data is only written out to level two unified cache 130 on an eviction of the modified cache entry. If there is a write cache miss in level one data cache 123 (No at decision block 322), then the address and write data are supplied to level two unified cache 130 (processing block 325). Then level two unified cache 130 must deal with the data. This may include writing to a cache entry corresponding to that address if present within level two unified cache 130 or writing out to external main memory. If central processing unit 110 generates a read to this data, then the read generates a read cache miss in level one data cache 123. Level two unified cache 130 must supply a cache fill including this data. A write miss does not change the cache state of any cache entry. Writing data into level one data cache 123 on a write hit may enable plural writes to be accumulated before needing to write this data to a higher level of memory. This may reduce write memory traffic to the higher level memory.

Two types of events within level two unified cache 130 trigger snoop cycles. Level two unified cache 130 may need to evict a cache entry which is also cached within level one data cache 123 (Yes at decision block 326). A snoop cycle is required to ensure the latest data is written out to the external main memory. A write snoop cycle is transmitted to level one data cache 123. This write snoop cycle misses if this data is not cached with level one data cache 123 (No at decision block 327). Level one data cache 123 reports the snoop miss to level two unified cache 130. No cache states within level one data cache 123 are changed. Upon receipt of the snoop miss report, level two unified cache 130 knows that it holds the only copy of the data and operates accordingly. If the snoop cycle hits a cache entry within level one data cache 123 (Yes at decision block 327), the response differs depending on the cache state of the corresponding cache entry. If the cache entry is not in modified state 303 (No at decision block 328), then level two unified cache 130 has a current copy of the data and can operate accordingly. The cache entry is invalidated within level one data cache 123 (processing block 329). It is impractical to maintain cache coherency if level one data cache 123 caches the data and level two unified cache 130 does not. Thus the copy of the data evicted from level two unified cache 130 is no longer cached within level one data cache 123. If the cache entry in level one data cache 123 is in the modified state 303 (Yes at decision block 328) and thus had been modified within that cache, then the snoop response includes a copy of the data (processing block 330). Level two unified cache 130 must merge the data modified in level one data cache 123 with data cached within it before eviction to external memory. The cache entry within level one data cache 123 is invalidated (processing block 329).

A direct memory access cycle to an SRAM configured portion of level two unified cache 130 will also be snooped into level one data cache 123. Note that the portion of the address space allocated to this SRAM may be cacheable. In this event, a direct memory access to this SRAM may be to an address cached in level one data cache 123. There are two possibilities, a direct memory access read and a direct memory access write. A direct memory access read from level two unified cache 130 (Yes at decision block 331) is treated by level one data cache 123 the same as a cache entry eviction in level two unified cache 130. Level two unified cache 130 generates a snoop cycle to level one data cache 123. On a snoop miss (No at decision block 327), level two unified cache 130 stores the only copy of the data. The direct memory access read is handled within the SRAM configured portion of level two unified cache 130. On a snoop hit (Yes at decision block 327) and if the cache entry is not in modified state 303 (No at decision block 328), then the response is the same as a snoop miss. The cache entry is invalidated (processing block 329). The SRAM configured portion of level two unified cache 130 has a current copy of the data and can service the direct memory access read. If the cache entry in level one data cache 123 is in the modified state 303 (Yes at decision block 328), then the snoop response includes a copy of the data (processing block 330). The cache entry within level one data cache 123 is invalidated (processing block 329). This invalidation within level one data cache 123 is not strictly required because the data within level two unified cache 130 is not changed. This invalidation does enable the same protocol within level one data cache 123 to be used for both level two unified cache 130 evictions and direct memory access reads. This simplifies the cache coherence policy within level one data cache 123. Since the data remains within the SRAM configured portion of level two unified cache 130, if central processing unit 110 needs this data after the direct memory access read a cache fill cycle within level one data cache 123 serviced from level two unified cache 130 provides the data. The snoop return data is merged in the SRAM configured portion of level two unified cache 130 and then the direct memory access is serviced.

The same protocol is used for a direct memory access write to an SRAM configured portion of level two unified cache 130. In this event (Yes at decision block 332), level two unified cache 130 initiates a snoop cycle to level one data cache 123. If there is a snoop miss (No at decision block 327), there are no changes in the cache state of any cache entry because this data is not cached within level on data cache 123. If there is a snoop hit (Yes at decision block 327) then the direct memory access is to an address cached in level one data cache 123. If the cache entry is not in modified state 303 (No at decision block 328), then the response is the same as a read snoop miss. The cache entry is invalidated (processing block 329). Level one data cache 123 does not have an altered copy of the data. If the cache entry in level one data cache 123 is in the modified state 303 (Yes at decision block 328), then the snoop response includes a copy of the data (processing block 330). The size of the cache entry within level one data cache 123 is larger than the data transfer size into the SRAM configured portion of level two unified cache 130. Thus if the cache entry is modified, it could include data other than the data of the SRAM write. This data must be evicted to level two unified cache 130. The cache entry within level one data cache 123 is invalidated (processing block 329). This invalidation does enable the same protocol within level one data cache 123 to be used for both level two unified cache 130 evictions and direct memory access reads. This simplifies the cache coherence policy within level one data cache 123. Since the data remains within the SRAM configured portion of level two unified cache 130, if central processing unit 110 needs this data after the direct memory access read a cache fill cycle within level one data cache 123 serviced from level two unified cache 130 provides the data. The snoop return data is merged in the SRAM configured portion of level two unified cache 130 and then the direct memory access is serviced.

Figure 6:
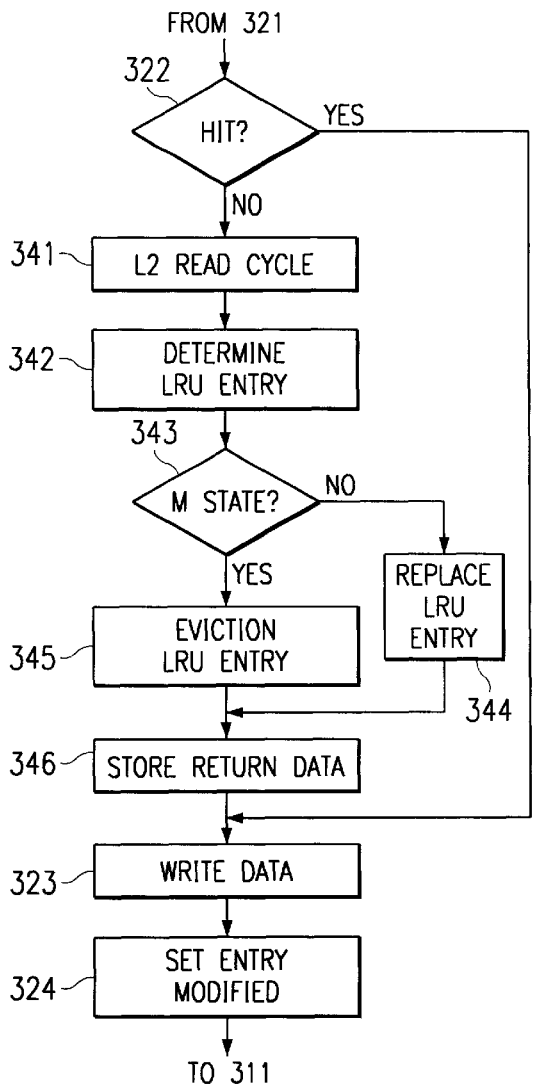
FIG. 6 is a flow chart illustrating a portion of a write allocation alternative cache coherence model for the level one data cache illustrated in FIG. 1.

FIG. 6 illustrates a variation of the write back technique called write allocation. The blocks of FIG. 6 replace blocks 322 to 325 of FIG. 5. This operates differently on a write miss into level one data cache 123. For a central processing unit write (Yes at decision block 321) and a write miss (No at decision block 322), level one data cache 123 requests this data from level two unified cache 130 (processing block 341). Level two unified cache 130 either supplies this data from within or requests the data from external main memory. This data is then supplied to level one data cache 123 as a cache fill. Upon such a cache read miss, the least recently used cache entry corresponding to the memory address producing the miss will be determined (processing block 342). If that entry is not in modified state 303 (No at decision block 343), then that cache entry is merely replaced. The cache state is set to the invalid state 301 for the cache entry to be replaced (processing block 344). Next the data returned in response to the cache fill from level two unified cache 130 or from external memory is stored (processing block 346). Upon storage of this data within level one data cache 123 this cache entry is set to the shared state 302. The write which generated the write cache miss is then carried out to the cache entry (processing block 323) and the cache state of that entry is set to the modified stats 303 (processing block 324). If that entry is in modified state 303 (Yes at decision block 343), then that cache entry must be evicted (processing block 345) to make room for this new data. This eviction takes place as described above. The data returned in response to the cache fill is stored (processing block 346), the write is then carried out to that cache entry (processing block 323) and the cache state is set to the modified state 303 (processing block 324). Write allocation may save a later read miss or write miss to the same cache entry.

Figure 7:
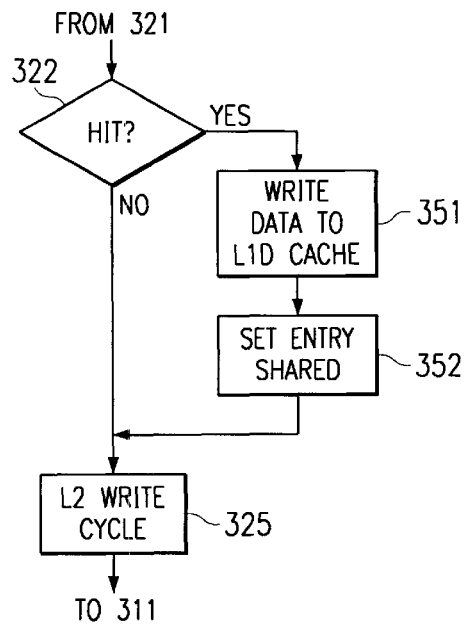
FIG. 7 is a flow chart illustrating a portion of a write through alternative cache coherence model for the level one data cache illustrated in FIG. 1.

FIG. 7 illustrates the cache coherence model for level one data cache 123 employing a write through policy, which is an alternative to a write back cache policy. The blocks of FIG. 6 replace blocks 322 to 325 of FIG. 5. In a write through cache policy all writes proceed to level two unified cache 130 even on a write hit. Level two unified cache 130 may deal with the write data or pass the write out to external main memory. On a write cache miss within level one data cache 123 (No at decision block 322), no change is made to the cache state of any cache entry. The write data is transferred to level two unified cache 130 (processing block 325), which will store it or write to external memory. On a write hit within level one data cache 123 (Yes at decision block 322), the data is written into the cache (processing block 351). The cache entry remains in the shared state (processing block 352). Because the write data is always passed through to the higher level memory, no cache entry is ever set to the modified state. The write data is transferred to level two unified cache 130 (processing block 325). Other aspects of the cache coherence technique are as previously described in conjunction with FIG. 5.

In the preferred embodiment level two unified cache 130 is a 64 Kbyte memory having a cache entry size of 128 bytes. Level two unified cache 130 is preferably four way set associative. Thus each memory address aliasing into a particular set may be stored in one of four corresponding cache entries. This cache size, organization and cache entry size results in 128 cache sets. Each cache entry includes address and tag bits organized as noted in Table 3.

TABLE 3

|  | Tag | Set | Offset |
| --- | --- | --- | --- |
| Bit Numbers | 31:14 | 13:7 | 6:0 |
| Number of Bits | 18 | 7 | 7 |

The memory is preferably organized as four banks of 64 bit memory. Servicing a miss from level one instruction cache 121 requires an access from each bank. Since the level one instruction cache 121 cache entry size is 64 bytes (512 bits), two accesses are required to complete a level one instruction cache fill. If there are no bank conflicts, level two unified cache 130 can service one cache fill to level one data cache 123 and a read or write to data transfer bus 143. Due to banking constraints level two unified cache 130 can service only a single 64 bit write at a time. The tag memory includes three read ports, one each for level one instruction cache 121, level one data cache 123 and data transfer bus 143.

Figure 8:
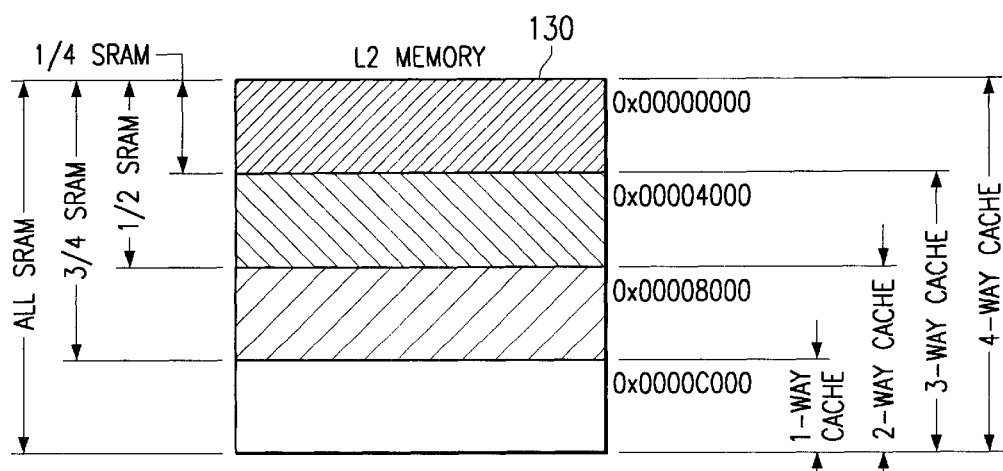
FIG. 8 illustrates the manner of partitioning level two unified cache as cache or directly addressable memory.

As illustrated in FIG. 8 and previously described, level two unified cache 130 may be configured as part cache and part directly addressable SRAM. A portion of the address space is reserved for the maximum allocation of SRAM. The cache way of level two unified cache 130 depends upon the amount configured as SRAM. The memory is divided into four parts. None, one, two, three or all four of these parts may be configured as SRAM. The remaining parts of memory serve as cache. When the whole is configured as cache it is organized as four way set associative. Any memory address may be stored in four cache entries within the cache. A four way least recently used replacement algorithm is used. Configuration of each of the four parts of the memory as directly addressed SRAM reduces the associativity of the cache. When three of the four parts are configured as SRAM, the cache direct mapped. When all four parts are configured as SRAM caching is disabled and all cache service for level one instruction cache 121 and level one data cache 123 is serviced by data transfer bus 143 from external memory.

As shown in FIG. 8, the portions of level two unified cache 130 partitioned as SRAM have predetermined addresses. Digital signal processor system 100 preferably employs a 32 bit address. FIG. 8 shows the addresses assigned to the SRAM configured portions of level two unified cache 130 in hexadecimal. The first quarter starts at Hexadecimal 00000000. When one quarter of level two unified cache 130 is configured as SRAM, this memory occupies addresses between Hex 00000000 and Hex 00003FFF. The second quarter starts at Hexadecimal 000040000. When half of level two unified cache 130 is configured as SRAM, this memory occupies addressed between Hex 00000000 and Hex 00007FFF. The third quarter starts at Hexadecimal 000080000. When three quarters of level two unified cache 130 is configured as SRAM, this memory occupies addresses between Hex 00000000 and Hex 0000BFFF. The final quarter starts at Hexadecimal 0000C0000. When all of level two unified cache 130 is configured as SRAM, this memory occupies addresses between Hex 00000000 and Hex 0000FFFF. Read accessed to addresses within these ranges when configured as cache will return invalid data. Write accesses to addresses within these ranges when configured as cache will be discarded and not change the data stored in level two unified cache 130.

Figure 9:
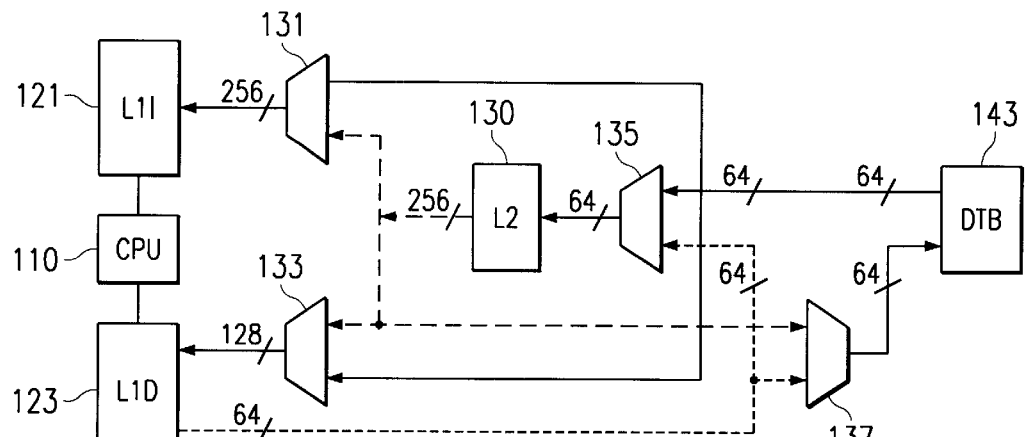
FIG. 9 illustrates the data paths to and from the level two unified cache illustrated in FIG. 1.

FIG. 9 illustrates the data connections among parts of digital signal processing system 100 illustrated in FIG. 1. FIG. 9 illustrates the data path widths between the various parts. The level one instruction cache interface includes a 256-bit data path from level two unified cache 130 to level one instruction cache 121. This data path size corresponds to one half of the 64 byte cache entry size within level one instruction cache 121 and equals one instruction fetch packet. In the preferred embodiment, the 256-bits are 64 bits from each of the four banks of level two unified cache 130. Thus level two unified cache 130 can source this amount of data in a single cycle. This occurs regardless of the amount of level two unified cache 130 configured as cache. The cache/SRAM partitioning within level two unified cache 130 is across the data banks rather than within the data banks. Thus level two unified cache 130 can always supply 256 bits to level one instruction cache 121 if any part is partitioned as cache. Level one instruction cache 121 may also receive data directly from data transfer bus 143, for example upon fetching code from non-cacheable memory addresses. Data transfer bus 143 needed to accumulate the 256 bits. The data source for transfers to level one instruction cache 121 is selected by multiplexer 131. FIG. 1 illustrates supply of 32 address bits from level one instruction cache 121 to level two unified cache 130. Because level one instruction cache 121 operates on 256 bit boundaries, the 8 least significant bits are always zero and may be omitted from the address. Note that writes to level one instruction cache 121 are not permitted, therefore level one instruction cache 121 never supplies data to level two unified cache 130.

The level one data cache interface includes a 128-bit data path from level two unified cache 130 to level one data cache 123. In the preferred embodiment, the 128 bits are 64 bits from each of two banks of level two unified cache 130. This assumes no bank conflicts with other data transfers. Level two unified cache 130 only services one cache fill data transfer to level one data cache 123 per cycle. Thus if two load/store units in central processing unit 110 each request data and produce a read cache miss within level one data cache 123, the two read miss requests to level two unified cache 130 are serviced in sequence. As noted above, the cache/SRAM partitioning of level two unified cache 130 is across the memory banks. Thus level two unified cache 130 can supply data to level one data cache 123 from two banks so long as level two unified cache 130 is partitioned to include some cache. Level one data cache 123 may also receive data directly from data transfer bus 143, for example upon fetching data from non-cacheable memory addresses. Data transfer bus 143 supplies only 64 bits per cycle, however accesses to non-cacheable memory addresses are at most 32 bits. In this case, the 32 bits are transferred in a single data transfer cycle. The data source for transfers to level one data cache 123 is selected by multiplexer 133. FIG. 1 illustrates supply of two sets of 32 address bits from level one data cache 123 to level two unified cache 130. Because level one data cache 123 operates on 64 bit boundaries, the 6 least significant bits are always zero and may be omitted from the address.

Level one data cache 123 may supply data to level two unified cache 130. This occurs on a write miss, a cache entry eviction and a response to a snoop hit to data in the modified state within level one data cache 123. It is possible that each of the load/store units within central processing unit 110 would require data transfer from level one data cache 123 to level two unified cache 130 in the same cycle. Upon a write miss within level one data cache 123, only the 32 bits of the write data is supplied from level one data cache 123 to level 2 unified cache 130. For either a cache eviction or a snoop data response, level one data cache 121 supplies 128 bits to level two unified cache 130, the same data width as opposite transfers. Data from level one data cache 123 may also be supplied to data transfer bus 143 as selected by multiplexer 137. This could occur as a result of a write to a non-cacheable address.

The interface between level two unified cache 130 and data transfer bus 143 includes two 64-bit data busses. A first of these data busses supplies data from data transfer bus 143 to level two unified cache 130. This data may be stored in level two unified cache 130 via a single 64-bit write port as selected by multiplexer 135. The second bus is a 64-bit bus supplying data from level two unified cache 130 or level one data cache 123 as selected by multiplexer 137. All transfers using data transfer bus 143 employ direct memory access unit 150 responsive to: commands via transfer request bus 141.

Figure 10:
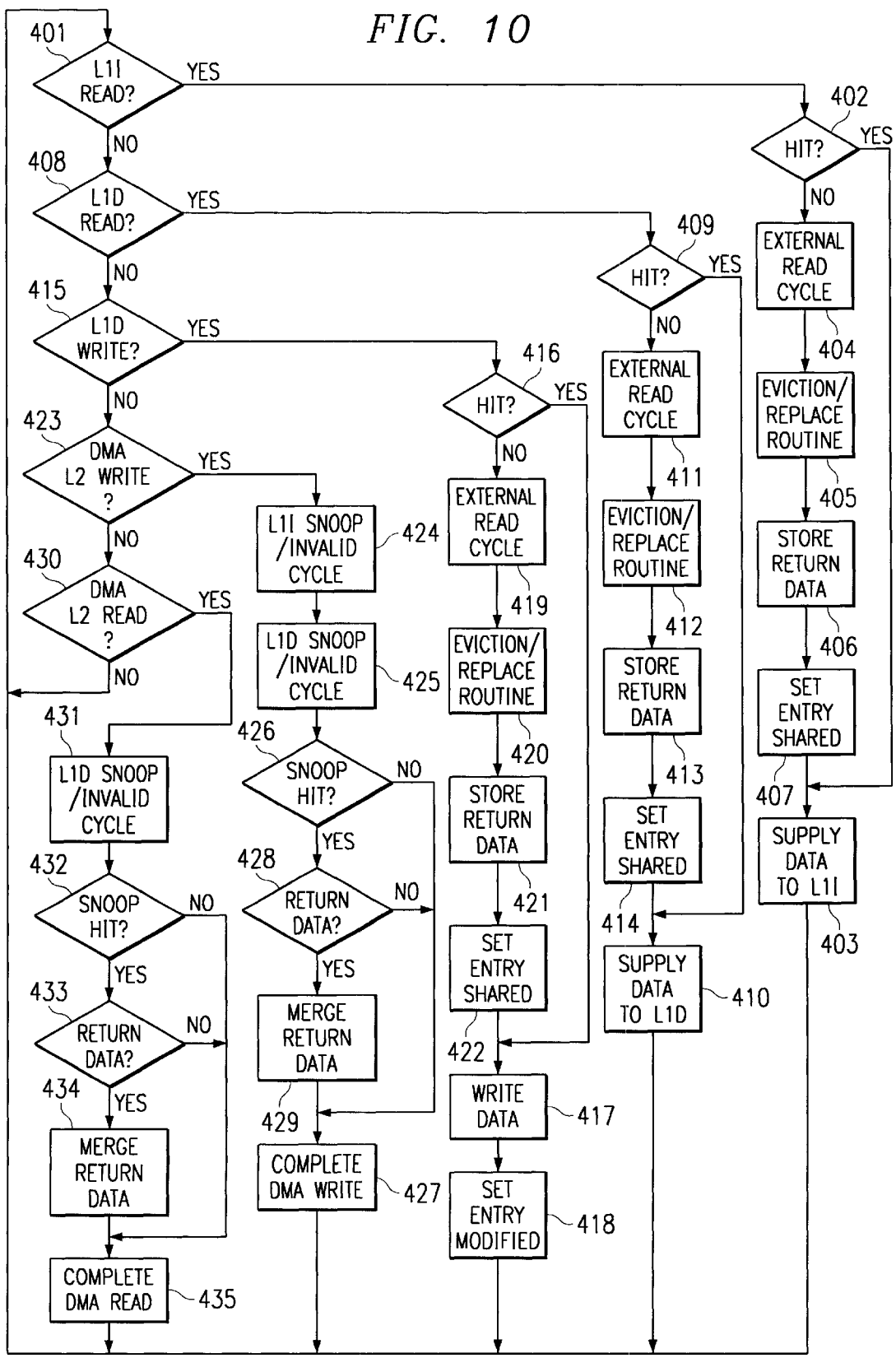
FIG. 10 is a flow chart illustrates the preferable cache coherence process for the level two unified cache illustrated in FIG. 1.

FIG. 10 is a flow chart illustrating the cache coherence process of the level two unified cache 130. Level two unified cache 130 stores a cache entry state of invalid, shared and modified for each cache entry. This is similar to that illustrated in FIG. 4. For the simplest case, upon a instruction read for cache service due to a miss within level one instruction cache 123 (Yes at decision block 401) and a cache hit (Yes at decision block 402), level two unified cache 130 supplies the requested instruction to level one instruction cache 123 (processing block 403). This involves no change in the cache state of any cache entry.

Figure 11:
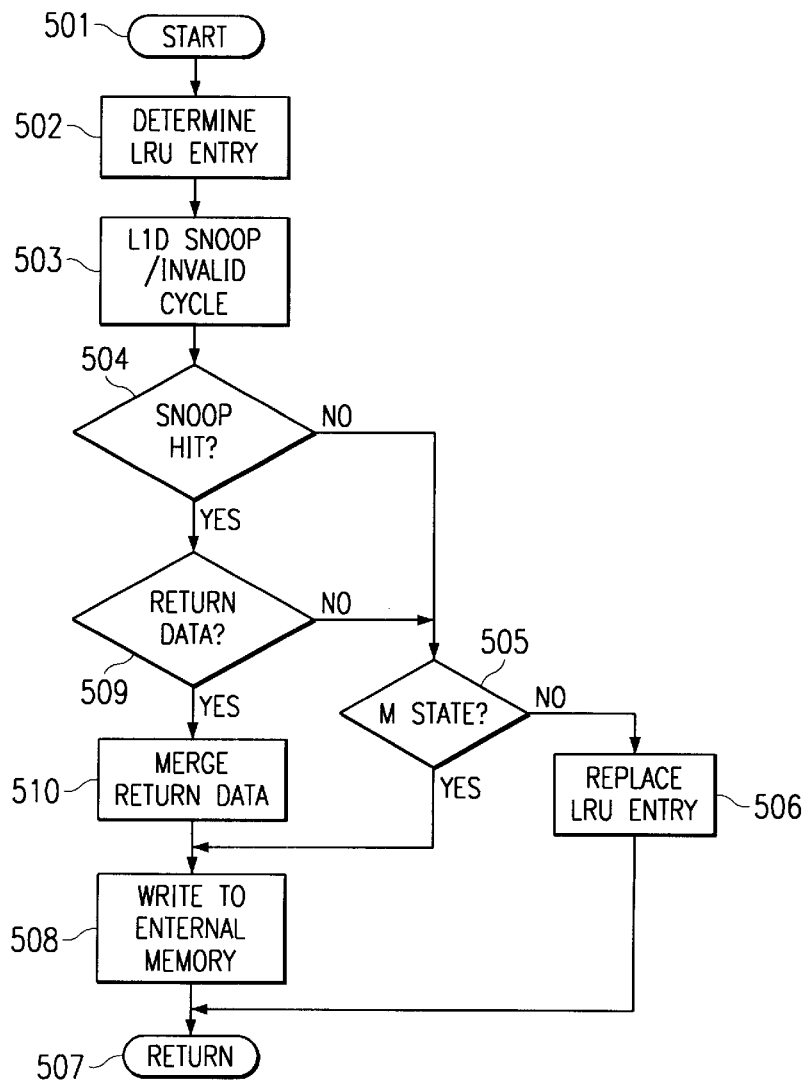
FIG. 11 is a flow chart illustrating the preferable cache coherence process for a level one cache read or write miss cache entry eviction/replacement.

On a cache miss within level two unified cache 130 (No at decision block 402), level two unified cache 130 requests the data from external memory via data transfer bus 143 (processing block 404). Level two unified cache 130 requests the data needed by level one instruction cache via transfer request bus 141. Level two unified cache 130 must then evict or replace a cache entry (processing block 405). This subroutine is illustrated in FIG. 11. Upon entering the subroutine (start block 501), level two unified cache 130 determines the least recently used cache entry that can store the data at the memory address requested (processing block 502). Recall that in the preferred embodiment level two unified cache 130 may be configured in whole or in part as directly accessible SRAM. Further the set associativity of level two unified cache 130 depends upon this configuration. Level two unified cache 130 then initiates a snoop/invalidate cycle to level one data cache 123 (processing block 503). Recall that level one data cache 123 may store a later copy of the data than that stored in level two unified cache 130. If this is the case, then the data written out to external memory must be the later copy within level one data cache 123. A snoop miss (No at decision block 504) indicates that level one data cache 123 does not store the data for that address. If the cache entry within level two unified cache 130 is not modified (No at decision block 505), then this data need not be written out to external memory. Neither level one data cache 123 not level two unified cache 130 stores a modified copy of this data. Thus the cache entry is merely replaced without writing out to external memory (processing block 506) and the subroutine is complete (subroutine return block 507). If the cache entry within level two unified cache 130 is modified (Yes at decision block 505), then this data is written out to external memory (processing block 508) and the subroutine is complete (subroutine end block 507). If there is a snoop hit within level one data cache 123 (Yes at decision block 504), level two unified cache 130 checks for return data (decision block 509). If there is no return data (No at decision block 509), then the copy of the data stored in level one data cache 123 is not modified. If the cache entry within level two unified cache 130 is not modified (No at decision block 505) it is merely replaced (processing block 506) and the subroutine is complete (subroutine return block 507). If the cache entry within level two unified cache 130 is modified (Yes at decision block 505), then this data is written out to external memory (processing block 508) and the subroutine is complete (subroutine return block 507). Receipt of return data from level one data cache 123 (Yes at processing block 509) indicates that this data has been modified within level one data cache 123. Accordingly, this return data is merged with the data stored in level two unified cache 130 (processing block 510). Because the cache entry length may differ between level one data cache 123 and level two unified cache 130, a modified cache entry within level one data cache 123 may correspond only part of a cache entry within level two unified cache 130. The merged data is written to external memory (processing block 508) and the subroutine is complete (subroutine return block 507).

Referring back to FIG. 10, following the eviction/replacement subroutine (processing block 405), the requested data from the external memory is stored within the determined location in level two unified cache 130 (processing block 406). This cache entry is marked shared (processing block 407). Then the data is supplied to level one instruction cache 121 (processing block 403). Note that a level two unified cache miss due to a level one instruction cache miss may require eviction of data from level two unified cache 130 also cached in level one data cache 123. Thus the snoop cycle with the possibility of return of data modified in level one data cache 123 is required.

Servicing a read miss within level one data cache 123 is similar. Upon a data read for cache service due to a miss within level one data cache 123 (Yes at decision block 408) and a cache hit (Yes at decision block 409), level two unified cache 130 supplies the requested instruction to level one data cache 123 (processing block 410). On a cache miss within level two unified cache 130 (No at decision block 409), level two unified cache 130 requests the data from external memory via data transfer bus 143 (processing block 411). Level two unified cache 130 requests the data needed by level one instruction cache via transfer request bus 141. Level two unified cache 130 must then evict or replace a cache entry (processing block 412). This subroutine is illustrated in FIG. 11 described above.

Following the eviction/replacement subroutine (processing block 412), the requested data from the external memory is stored within the determined location in level two unified cache 130 (processing block 413). This cache entry is marked shared (processing block 414). Then the data is supplied to level one data cache 123 (processing block 410).

Level one data cache 123 may request cache service from level two unified cache 130 for a write operation (decision block 415). On a write miss from level one cache 123 (Yes at decision block 415) and a cache hit within level two unified cache 130 (Yes at decision block 416), level two cache 130 writes this data within (processing block 417) overwriting the previously stored data. The cache entry is then marked as modified (processing block 418) completing the level one cache service.

A cache miss within level two unified cache 130 (No at decision block 416) generates a write allocation cycle. Level two unified cache 130 preferably operates in a write back mode with write allocation. Thus upon a write miss the corresponding data is recalled from external memory and the write takes place within level two unified cache 130. Upon such a write cache miss (No at decision block 416), level two unified cache 130 requests that data from external memory (processing block 419). Next is an eviction/replacement routine (processing block 420) such as previously described with reference to FIG. 11. The data returned from the external memory is stored within level two unified cache 130 (processing block 421) and that cache entry is marked as shared (processing block 422). Then the write takes place into the cache entry (processing block 417) and the cache entry is marked in the modified state (processing block 418).

Direct memory access data transfers under the control of direct memory access unit 150 also generate cache coherence actions. Upon a direct memory access write into an SRAM configured portion of level two unified cache 130 (Yes at decision block 423), level two unified cache 130 generates a snoop/invalidate cycle to level one instruction cache 121 (processing block 424) and to level one data cache 123 (processing block 425). If data for the addresses of the direct memory access write are stored in either cache, the corresponding cache entries are marked invalid. The direct memory access write to a SRAM configured portion of level two unified cache creates data later than that stored in the respective level one caches. Thus the currently cached data is no longer valid. Note that the snoop/invalidate cycle to the level one instruction cache 121 is open loop because this cache never modifies data. The situation is different for level one data cache 123. Level one data cache 123 may store data in a cache entry other than at the direct memory access write address that is modified. Thus the cache entry within level one data cache 123 cannot be merely invalidated. If there is a snoop miss within level one data cache 123 (No at decision block 426), then this data is not cached within level one data cache 123. Thus the direct memory access write can complete into the SRAM configured portion of level two unified cache 130 (processing block 427). If there is a snoop hit within level one data cache 123 (Yes at decision block 426), level two unified cache 130 checks for return data (decision block 428). If there is no return data (No at decision block 428), then the copy of the data cached within level one data cache 123 is unmodified. Thus the direct memory access write can complete into the SRAM configured portion of level two unified cache 130 (processing block 427). If there is return data from level one data cache 123 (Yes at decision block 428), then the copy of the data cached within level one data cache 123 has been modified. Accordingly, this data is merged with the data cached within level two unified cache 123 (processing block 429) and the direct memory access write completes (processing block 427) into the level two unified cache entry storing the merged data. Using this technique, the SRAM configured portion of level two unified cache 130 stores the latest data. If the direct memory access write is to an address modified within level one data cache 123, then the modified data is overwritten as required by the direct memory access write. If the direct memory access write is to an address not modified within level one data cache 123 but other data in the same level one data cache entry is modified, then the correct data is merged in the SRAM configured portion of level two unified cache 130. The level one data cache entry is invalidated upon a snoop hit. If central processing unit 110 needs this data, then level one data cache 123 will generate a cache read miss which will be serviced from the SRAM configured portion of level two unified cache 130.

A direct memory access read from an SRAM configured portion of level two unified cache 130 (decision block 430) also generates cache coherence actions. Upon a direct memory access read from an SRAM configured portion of level two unified cache 130 (Yes at decision block 430), level two unified cache 130 generates a snoop/invalidate cycle to level one data cache 123 (processing block 431). Level one data cache may hold a later copy of the data than currently stored in the SRAM portion of level two unified cache 130. Since level one instruction cache 121 cannot modify data stored within, it is not necessary to snoop level one instruction cache 121. If there is a snoop miss within level one data cache 123 (No at decision block 432), then this data is not cached within level one data cache 123. Thus the direct memory access can complete from the SRAM configured portion of level two unified cache 130 (processing block 433). If there is a snoop hit within level one data cache 123 (Yes at decision block 432), level two unified cache 130 checks for return data (decision block 433). If there is no return data (No at decision block 433), then the copy of the data cached within level one data cache 123 is unmodified. Thus the direct memory access can complete from the SRAM configured portion of level two unified cache 130 (processing block 435). If there is return data from level one data cache 123 (Yes at decision block 433), then the copy of the data cached within level one data cache 123 has been modified. Accordingly, this data is merged with the data cached within level two unified cache 123 (processing block 434) and the direct memory access completes (processing block 435) using the merged data.

There are eight potential data transfers associated with level two unified cache 130. Thus a priority scheme among these transfers is needed. Table 4 lists the preferred priority hierarchy within level two unified cache 130.

TABLE 4

| Priority Level | From | To | Task |
|---|---|---|---|
| 1 | L2 | L1I | L1I cache miss and L2 cache hit |
| 2 | L2 | L1D | L1D cache miss and L2 cache hit |
| 3 | L1D | L2 | L1D victim eviction (writeback) to L2 |
| 4 | L2/SRAM | External Memory | Direct memory access read from L2/SRAM |
| 5 | External Memory | L2/SRAM | Direct memory access write to L2/SRAM |
| 6 | L1D | L2 | L1D snoop data merge into L2 |
| 7 | External Memory | L2 | L2 cache miss fill |
| 8 | L2 | External memory | L2 victim eviction (writeback) to external memory |

Note: "L2" refers to a cache configured portion of level two unified cache 130; and L2/SRAM refers to a directly addressable memory configured portion of level two unified cache 130.

Figure 12:
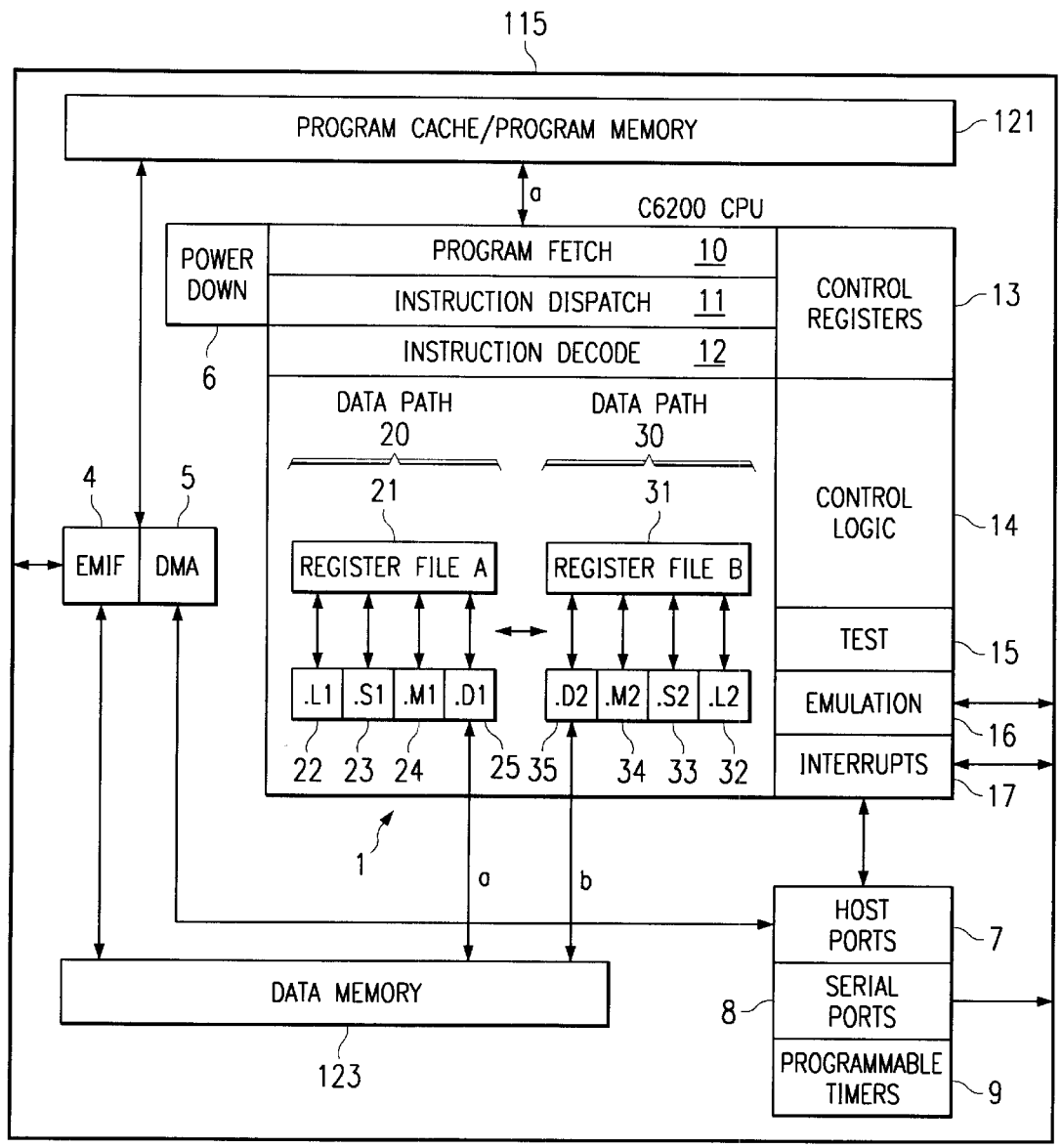
FIG. 12 illustrates further details of a very long instruction word digital signal processor core suitable for use as the central processor unit illustrated in FIG. 1.

FIG. 12 is a block diagram illustrating details of a digital signal processor core 115 suitable for use as central processing unit 110 of FIG. 1. FIG. 12 also illustrates the connections between the digital signal processor core and level one instruction cache 121 and level one data cache 123. Digital signal processor core of FIG. 12 is a 32-bit eight-way VLIW pipelined processor. Digital signal processor core 115 includes central processing unit 1, shown in the right center portion of FIG. 12. Digital signal processor core 115 interface with level one instruction cache 121. Digital signal processor core 115 also interfaces with level one data cache 123. Digital signal processor core 115 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Digital signal processor core 115 has a 32-bit, byte addressable address space. Internal memory on the same integrated circuit is preferably organized in a data space and a program space. When off-chip memory is used, preferably these two spaces are unified into a single memory space via the external memory interface (EMIF) 4.

Level one data cache 123 may be internally accessed by central processing unit 1 via two internal ports 123a and 123b. Each internal port 123a and 123b preferably has 32 bits of data and a 32-bit byte address reach. Level one instruction cache 121 may be internally accessed by central processing unit 1 via a single port 121a. Port 121a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 13A:
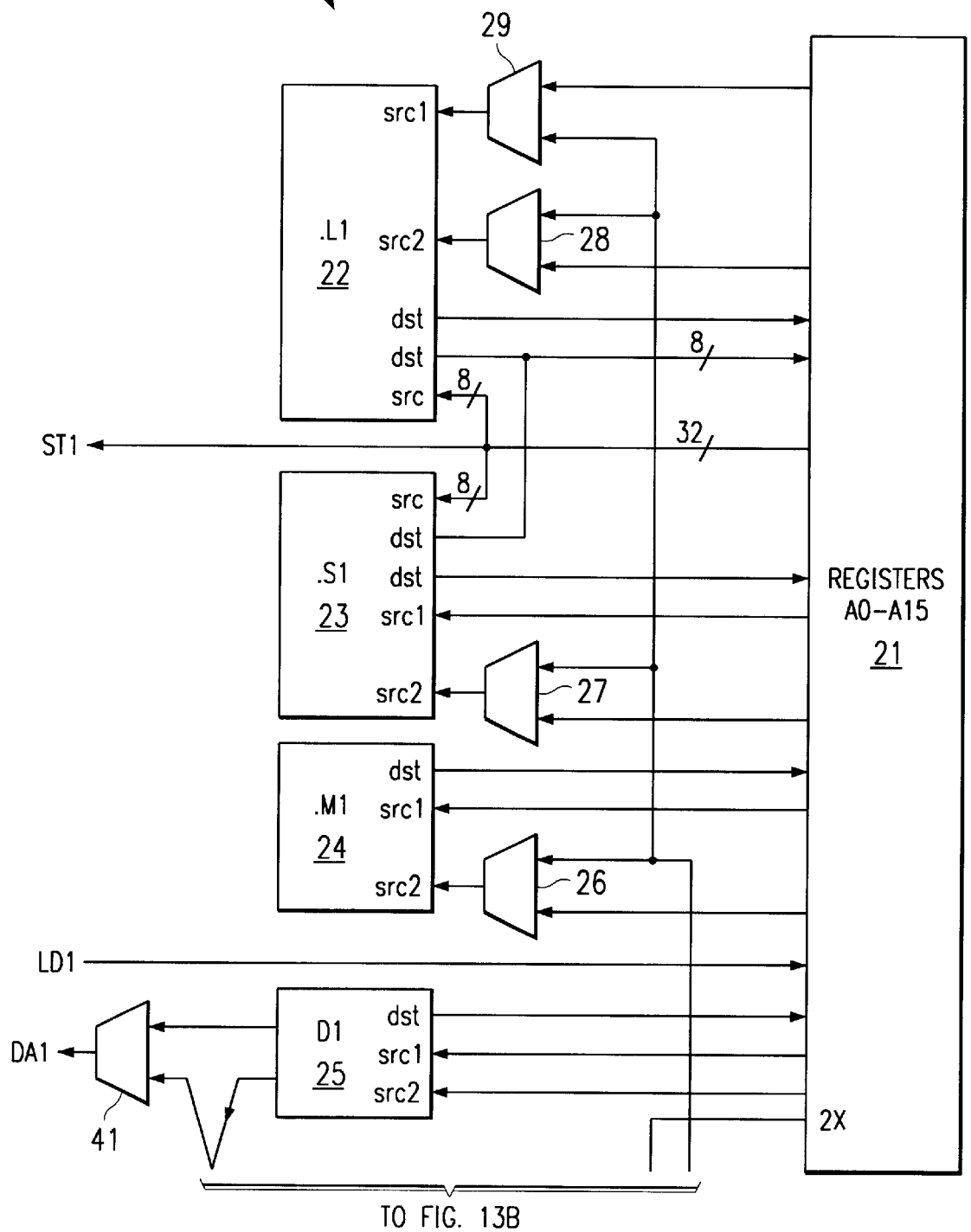
FIGS. 13A and 13B together illustrate additional details of the digital signal processor core of FIG. 12.
Figure 13B:
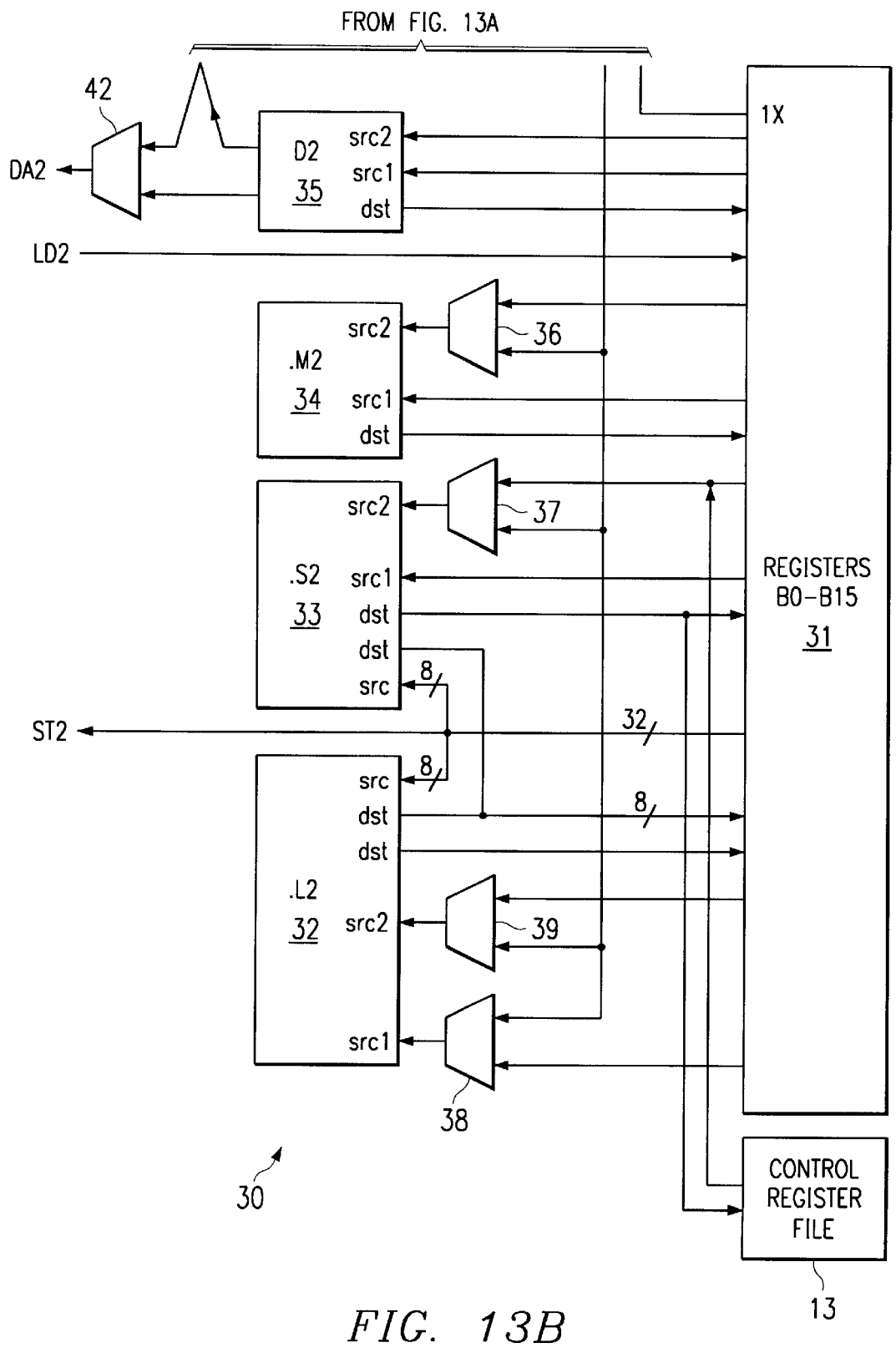

FIGS. 13A and 13B together illustrate the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 5 lists the functional capabilities of these four types of functional units.

TABLE 5

| Functional Unit | Description |
| --- | --- |
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic and bit-field operations<br>32/40 bit shifts<br>32 bit logical operations<br>Branching<br>Constant generation<br>Register transfers to/from control register file |
| M Unit (M1, M2) | 16 × 16 bit multiplies |
| D Unit (D1, D2) | 32-bit add, subtract, linear and circular address calculation |

Most data busses within central processing unit 1 support 32-bit operands. Some data busses support long (40-bit) operands. Each functional unit has its own 32-bit write port into the corresponding general-purpose register file. Functional units L1 unit 22, S1 unit 23, M1 unit 24 and D1 unit 25 write to register file 21. Functional units L2 unit 32, S2 unit 33, M2 unit 34 and D2 unit 35 write to register file 31. As depicted in FIG. 13, each functional unit has two 32-bit read ports for respective source operands src1 and src2 from the corresponding register file. The four functional units L1 unit 22, L2 unit 32, S1 unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIGS. 13A and 13B together illustrate cross register paths 1X and 2X. Function units L1 unit 22, S1 unit 23 and M1 unit 24 may receive one operand from register file 31 via cross register path 1X. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIGS. 13A and 13B together illustrate two data address paths (DA1 and DA2) coming from respective D units 25 and 35. These data address paths allow supply of data addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIG. 13B illustrates data paths enabling S2 unit 33 to read from and to write to the control register file 13.

What is claimed is:

1. A data processing system comprising:

a central processing unit executing program instructions to manipulate data;

at least one level one cache connected to said central processing unit temporarily storing at least one of program instructions for execution by said central processing unit and data for manipulation by said central processing unit;

a level two memory connected to said at least one level one cache, said level two memory including
      a level two unified cache temporarily storing instructions and data for supply of instructions to said at least one level one cache, and
      a directly addressable memory, said level two memory being a predetermined amount of memory programmably configurable as a selected amount of level two unified cache and a remaining amount of directly addressable memory;

a direct memory access unit connected to said central processing unit, said level two memory and adapted for connection to an external memory, said direct memory access unit controlling data transfer under command of said central processing unit; and a snoop unit connected to said at least one level one cache and to said direct memory access unit generating a snoop access to said at least one level one cache upon a direct memory access to said directly addressable memory.

2. The data processing apparatus of claim 1, wherein:

said at least one level one cache includes
      a level one instruction cache connected to said central processing unit temporarily storing program instructions for execution by said central processing unit, and
      a level one data cache connected to said central processing unit temporarily storing data for manipulation by said central processing unit;

said snoop unit generates a write snoop access to said level one instruction cache and to said level one data cache upon a direct memory access write to said directly addressable memory;

said level one instruction cache invalidates a cache entry upon a snoop hit to said cache entry following a write snoop access; and said level one data cache invalidates a cache entry upon a snoop hit to said cache entry following a write snoop access.

3. The data processing apparatus of claim 1, wherein:

said at least one level one cache includes
- a level one instruction cache connected to said central processing unit temporarily storing program instructions for execution by said central processing unit, and
- a level one data cache connected to said central processing unit temporarily storing data for manipulation by said central processing unit;

said snoop unit generates a write snoop access to said level one instruction cache and to said level one data cache upon a direct memory write access to said directly addressable memory;

said level one instruction cache invalidates a cache entry upon a snoop hit to said cache entry following a write snoop access; and said level one data cache invalidates a cache entry upon a snoop hit to said cache entry following a write snoop access and writes back said cache entry to said directly addressable memory if said level one data cache has modified said cache entry.

4. The data processing apparatus of claim 1, wherein:

said at least one level one cache includes
- a level one instruction cache connected to said central processing unit temporarily storing program instructions for execution by said central processing unit, and
- a level one data cache connected to said central processing unit temporarily storing data for manipulation by said central processing unit;

said snoop unit generates a read snoop access to said level one data cache upon a direct memory read access from said directly addressable memory; and said level one data cache invalidates a cache entry upon a snoop hit to said cache entry following a read snoop access and writes back said cache entry to said directly addressable memory if said level one data cache has modified said cache entry.

5. A data processing method comprising the steps of:

executing program instructions to manipulate data;

temporarily storing program instructions for execution by said central processing unit in a level one instruction cache;

temporarily storing data for manipulation by said central processing unit in a level one data cache;

programmably configuring a predetermined amount of level two memory as a selected amount of level two unified cache and a remaining amount of directly addressable memory;

temporarily storing instructions and data in said level two unified cache for supply of instructions to said level one instruction cache and supply of data to said level one data cache;

storing data in said directly addressable memory;

transferring data between said directly addressable memory and an external memory via a direct memory access unit under the command of a central processing unit; and snooping said level one instruction cache and said level one data cache upon a direct memory access of said directly addressable memory.

6. The data processing method of claim 5, further comprising the steps of:

snooping said one level one instruction cache and said level one data cache upon a direct memory access unit write access to said directly addressable memory;

invalidating a cache entry in said level one instruction cache upon a snoop hit to said cache entry following a write snoop access; and invalidating a cache entry in said level one data cache upon a snoop hit to said cache entry following a write snoop access.

7. The data processing method of claim 5, further comprising the steps of:

snooping said level one instruction cache and said level one data cache upon a direct memory access unit write access to said directly addressable memory;

invalidating a cache entry in said level one instruction cache upon a snoop hit to said cache entry following a write snoop access;

invalidating a cache entry in said level one data cache upon a snoop hit to said cache entry following a write snoop access; and writing back said cache entry in said level one data cache to said directly addressable memory if said cache entry has been modified by said level one data cache.

8. The data processing method of claim 5, further comprising the steps of:

snooping said level one data cache upon a direct memory access unit read access from said directly addressable memory; and invalidating a cache entry in said level one data cache upon a snoop hit to said cache entry following read snoop access; and writing back said cache entry in said level one data cache to said directly addressable memory if said cache entry has been modified by said level one data cache.

* * * * *